July 4, 1967     W. E. COWLEY     3,329,187
SAW HANDLE WITH BLADE TENSIONING MEANS
Filed Feb. 2, 1966     2 Sheets-Sheet 1
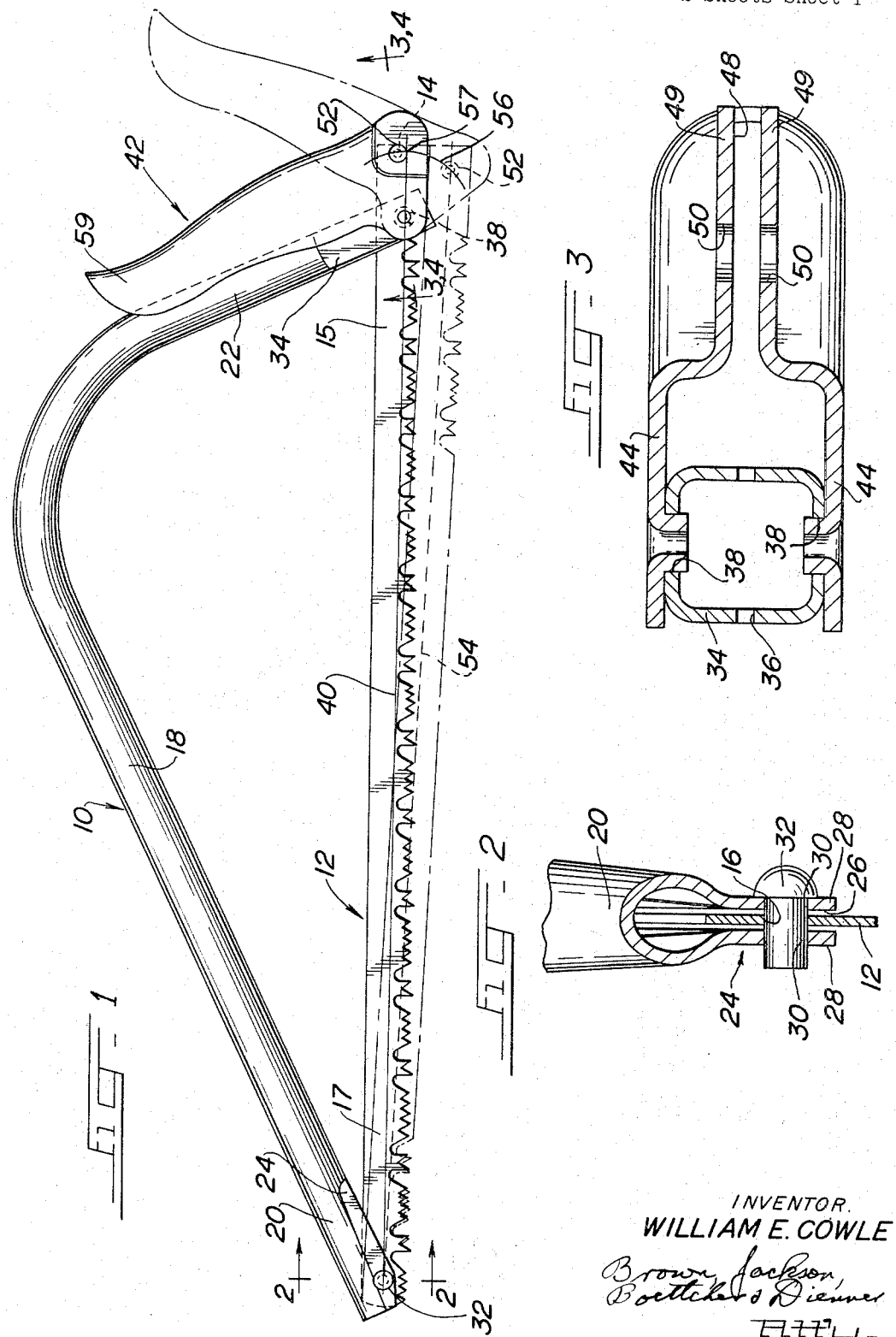
INVENTOR.
WILLIAM E. COWLEY

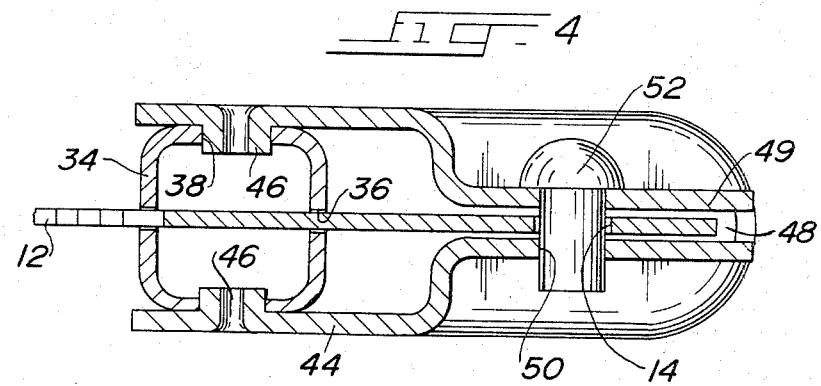
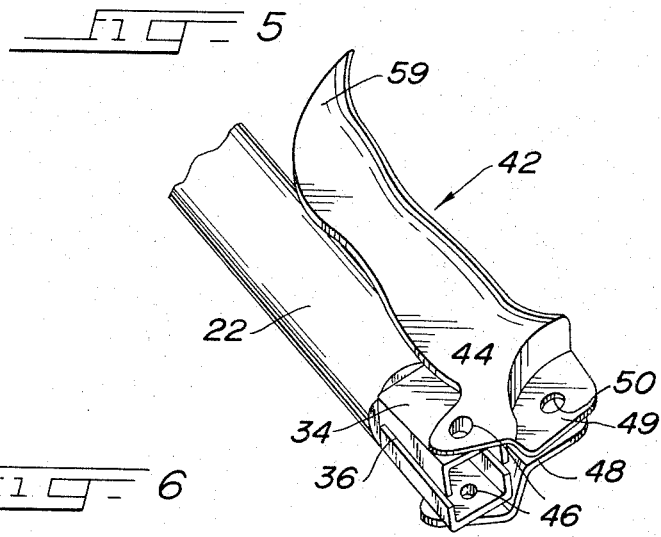
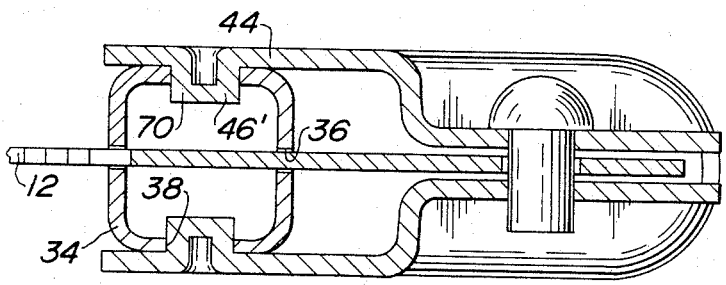

United States Patent Office 3,329,187
Patented July 4, 1967

3,329,187
SAW HANDLE WITH BLADE TENSIONING MEANS
William E. Cowley, Louisville, Ky., assignor to Vermont American Corporation, Louisville, Ky., a corporation of Kentucky
Filed Feb. 2, 1966, Ser. No. 524,648
5 Claims. (Cl. 145—33)

This invention relates to saws, and more particularly to a bow saw frame having a tension handle trunnioned to one end thereof for tensioning a saw blade connected across the opening of the bow frame.

In some known saws a tensioning lever is provided at one end of the bow. The blade is held between two stampings or straps which are riveted to a portion of the tensioning lever. A special pin must be staked to one of the straps to orient the blade therebetween and to align the straps.

However, in accordance with the present invention, a saw frame is provided having a flattened first end section and means, which may be in the form of a loose pin for pivotally mounting one end of a saw blade thereto. Secured to the other end of said frame is a one-piece tension lever or handle of a U-shaped cross-sectional configuration to which is pivotally connected the other end of the saw blade, which may also be obtained by a loose pin, which it receives when the handle is in a releasing or loading position.

A feature of the invention is that the tension lever or handle is secured to the frame end by means of inwardly facing integral trunnions, which journal in openings provided in the said second end of the bow frame. These trunnions are punched from the material of the handle and are therefore not only integral therewith but the manner of assembly also results in extensive savings both in labor and in material.

The journalling of the tension handle or lever to the frame is such that in the loading position of the saw frame, the tension handle is rotated to a position where its pivotal connection of the saw is located below a horizontal center line which extends through the pivotal mounting means at the first end of the bow frame and the axis of the trunnions on which the tension lever pivots. When the handle is thereafter pivoted about the trunnions, the axis of pull between the blade mounting means is located above the horizontal center line. With the handle so positioned, the tension handle tightens the saw blade between the pivot means and the connection, and also locks the blade in position so that it will not turn or loosen during use of the saw, as in a cutting operation.

It thus is an object of the present invention to provide an improved tension handle system for a saw frame having a reduced number of parts and which may be assembled with the frame at a reduced cost.

An additional object of the present invention is to provide a saw frame requiring a reduced number of labor operations.

A further object of the present invention is to provide a saw frame which is adapted to mass production techniques.

Other and further objects, features and advantages of the present invention will be apparent from the following description of an illustrated embodiment thereof, given for the purpose of disclosure, and taken in conjunction with the accompanying drawings in which like character references designate like parts throughout the several views and where:

FIGURE 1 is an elevational view illustrating a bow saw frame comprising one embodiment of the present invention;

FIGURE 2 is a sectional view taken through the first end of the saw frame along line 2—2 of FIGURE 1;

FIGURE 3 is a sectionaal view of the second end of the saw frame taken along lines 3—3 of FIGURE 1, the saw blade being omitted;

FIGURE 4 is a view generally similar ot FIGURE 3 and taken along the same lines, but showing the second end of the saw blade attached thereto;

FIGURE 5 is a perspective view of the last-mentioned end of the saw frame and showing the saw retaining slots and an open groove provided in the end of the frame and formed in the lower rear end of the tension handle, respectively;

FIGURE 6 is a view generally similar to FIGURE 4 and taken along the same lines, but showing a modified form of trunnion.

Referring now to the several figures and first to FIGURE 1, a saw, such as a bow or pruning saw, is shown for use generally at 10 provided with a saw blade 12 having a hole 14 adjacent at least one end 15 thereof and a hole 16 (FIGURE 2) adjacent its other end 17. Saw blade 12 is shown detachably mounted to a bow saw frame 18 which includes a first end 20 and a second end 22. Frame 18 is formed of a resilient stock and in a preferred embodiment is made of steel tubing. A flattened margin or section 24 is formed in the lower portion of the first end 20 of the frame 18. An open passage 26 (FIGURE 2) formed in the bottom of the margin 24, provides a pair of spaced parallel wall portions 28, one each on either side of a symmetrical plane through the frame 18.

In the illustrated embodiment, the spaced parallel wall portions 28 have axially aligned holes 30 formed therein which provide means through which a pin or rivet 32 may be passed for pivotally connecting the one end of blade 12 to the first end 20 of the frame 18. The rivet 32 acts as a pivot around which the saw blade 12 rotates while being attached to the frame 18. The wall portions 28 and open passage 26 are dimensioned to snugly support both sides of the end of the blade 17 and maintain the blade upright therebetween, thereby inhibiting twisting of said end of the saw blade 12 during use of the saw.

The second end 22 of the frame 18 is slotted to divide the same into a pair of spaced bifurcations 34. Slot 36 is disposed longitudinally to define a path coincident with the symmetrical plane through the frame to receive the other end 15 of the blade. Coaxial holes 38 are also formed through each bifurcation 34; the axis of the holes 38 is aproximately normal to the extent of slot 36 and in the illustrated embodiment the bifurcated end 34 is forged or otherwise formed to a square shaped cross section (FIGURES 4 and 5). The coaxial holes 38 are formed in two opposing sides of the square shaped cross section and the open slot 36 divides the two opposing sides of said end so that the bifurcations 34 are channel-shaped in cross section and have the coaxial hole portions 38 centrally of the webs thereof.

The axis of the coaxial holes 38 at the second end 22 of the frame and the axis of the axially aligned holes 30 at the first end 20 of the frame define a center line 40 passing through said axes normal thereto.

A tension lever or handle 42 is pivotally connected to the second end 22 of the frame 18. Said handle 42 is pressed from a single piece of deformable, rigid material to have a generally U-shaped cross section and a pair of essentially flat wings or ears 44 in the lower front end of the handle 42 which are afterwards folded to the essentially parallel spaced relation illustrated by FIGURE 3. When the handle 42 is formed portions of said wings are pressed therefrom to form integral trunnions 46. The trunnions may be punched completely through as shown in FIGURE 3 or with a bottom portion 70 as in FIGURE 6. The integral trunnions thus formed permit extensive savings in labor and materials, and obviate the necessity of rivets or other attaching devices. When the handle is formed, the ears or wings 44 are left spread apart sufficiently to allow the trunnions 46 to slide over the webs of the bifurcated portions 34. These are assembled by aligning the trunnions with the coaxial holes 38 and pressing the ears 44 into the parallel spaced relation and journalling the trunnions 46 in the holes 38. As thus assembled, the tension handle 42 is positively secured to the saw frame end so that the ears 44 lie outside of and adjacent the webs of the bifurcated portions 34 and the pair of integrally formed trunnions 46 are journalled in holes 38 so that the handle swings about the axis thereof. The large surface contact area thus provided between the wings 44 and the adjacent web portions of each bifurcated portion 34 adds stability to and prevents twisting of the handle 42 during its pivoting motion about said trunnions 46.

The lower rear end of the handle 42 is also previously pressed together to form a pair of substantially parallel plates 49 with an open groove 48 therebetween. When handle 42 is pivotally connected to the lower end of the frame 18, the open groove 48 is in alignment with the open slot 36 in the bifurcated portion 34 and the symmetrical plane through the frame, and so is adapted to receive the end 15 of the saw blade opposite that connected to the first end 20 of the frame as by rivet 32.

The plates or ears 49 of the lower rear end of the handle 42 also have axially aligned openings identified at 50, one in each plate. The axis of said openings 50 is substantially perpendicular to the groove 48.

In FIGURE 1, a loading or releasing portion of the handle 42 is shown in phantom lines. In its loading or releasing position, end 15 of the blade 12 may be easily assembled to or removed from the saw frame 18 by extending said end 15 of the saw blade through said groove 48 and locating a loose pin 52 through the aligned openings thereof (hole 14 of the blade and openings 50 in the lower rear end of the handle). Instead of a loose pin 52, other means, such as a rivet or bolt and nut may be employed. With the two ends of the blade thus assembled to the saw frame, a pull axis 54 is defined through and normal to the centers of the pivot means, comprising rivet 32 and pin 52. In the loading position, axis 54 is below the center line 40 and blade 12 is without tension.

To tension the blade and lock it in place, the handle 42 is pivoted in a counterclockwise direction about trunnions 46 until it abuts or closes against the rear portion of the second end 22 of the frame so as to be stopped from further counterclockwise rotation thereby.

During the counterclockwise motion of the tensioning handle 42, pull axis 54 is carried radially upward, connection 52 being caused to scribe a substantially arc-shaped path of travel 56 with rivet 32 as the pivotal center of said path. The rise 57 of the arc-shaped path of travel 56 coincides with and lies along the center line 40. Tensile forces are thereby introduced on the blade, which forces tend to compress the saw frame ends toward one another are at a maximum when the connection is approximately at the rise 57 of the arc-shaped path of travel 56. The location of the connection 52, the trunnions 46, and the configuration of the handle and particularly the lower rear end thereof are so dimensioned that the handle moves only a short arcuate distance when moving from a loading to a locked position, as shown in FIGURE 1. This makes the handle easy to operate. If the hand of the operator is sufficiently large, the handle may be moved from a loading position to a locked position with one hand. With the blade fixed to the handle 42 during this moving, a safety feature is provided because any relative motion between the blade and the handle is eliminated.

During the described counterclockwise motion of the handle, tension is applied to the blade 12, as mentioned. Compression is also applied between the spaced-apart ends 20, 22 of the frame 18. Application of said tensile and compressive forces causes rivet 32 to press tightly and to be locked in position against the relatively inner surface of the axially aligned holes 30. The back portion of the hole 16, through the blade 12, also is positioned tightly against the back of the rivet 32 substantially diametrically opposite the point where the rivet is pressing against the shoulders of the holes 30.

At the second end of the frame, the loose pin 52 is positioned tightly against the inner surface of the shoulders of the openings 50 and the rear portion of hole 14 in the blade is rested tightly against the pin 52 at a point substantially diametrically across from the tightly fixed portion of the pin 52. The simple connecting means at each end of the blade, which tighten when the saw blade is tensioned under the operation of the handle, make the replacement of a worn blade a relatively simple operation.

The back edge of the second end 22 prevents the handle 42 from rotating counterclockwise to a point where all tension and compression is lost. Thus, when the handle is in its locked position, sufficient compressive and tensile forces remain to attach the blade rigidly to the saw frame between the rivet 32 and the loose pin 52. In its locked position, the axis 54 is relatively above the center line 40.

With the connection 52 beyond the maximum point of tension and compression, the forces tend to pull the handle in a counterclockwise direction and force the handle snugly against the second end of the frame. These forces, the pivot axis positioning above the center line and the connection 52 positionment beyond the point of maximum forces tend to maintain the handle in its locked position. A deliberate manual act on the part of a user, such as rotating the handle in a clockwise direction, is required to return the handle to its loading position. Accidental release of the blade is difficult because in the locked position, the handle 42 is part of the frame which is gripped to effect the intended utility of the saw.

The configuration of the tension handle 42, when positioned in a cooperating relationship adjacent the second end of the frame provides a grip for the saw which substantially conforms to the grasp of a user and provides a comfortable feeling for the hand when the saw is being used for cutting branches and the like. The sides of the one-piece V-shaped handle blend into the thickness of the second end of the frame to present relatively smooth surfaces on the sides of the grip which enhance the comfort of the user's grasp.

An outstanding portion or flare 59 formed at the open top of the U-shaped handle provides a convenient thumb or finger hold to initiate a clockwise rotation of the handle and move it from a locked position to a releasing position.

A further advantage of the present invention is that during rotation of the handle 42 to its locked position, the blade 12 moves radially upward. During this radial movement, the one end of the blade 12, already positioned in the open groove 48 between the plates 49, moves relatively upward into the open slot 36 and substantially occupies the full width of the aligned slot and the groove. Thus, when the handle reaches its locked position, said one end of the blade is held tightly in the aligned slot 36 and open groove 48; said blade is thus coincident with the symmetrical plane through the frame. This rigid position of said one end of the blade 12 within the aligned slot and groove inhibits twisting of the blade. It is to be recalled that the opposite end of the blade is also snugly positioned between the portions 28 at the first end of the frame. By holding the blade rigidly upright at both ends thereof, twisting of the blade is difficult and a smooth straight cut is produced when the saw is used. By positively connecting the blade to the frame at both ends thereof, any manual compressive pressure applied on the bow will not release the blade from the frame, even if the blade binds during a cutting operation.

Thus, the present invention provides a low cost saw by reducing the number of parts required, in that is is produced from one integral stamping which is pivotally connected to the frame by trunnions journalled in the bifurcated portions. As described, the trunnions are fashioned from the material of the lever itself providing a saving in material and labor. Not only are the number of parts reduced, but also the number of steps in the manufacturing process. The reliability and the life of the product is thereby also increased.

Although I have described my invention with respect to certain specific embodiments thereof, I do not wish to be thereby limited, as various modifications of my invention are intended to be encompassed within its true spirit and scope as indicated by the following claims.

I claim:

1. A mount for the blade of a bow saw and the like comprising a frame having a pair of spaced ends, one end thereof being adapted for pivotal connection of a saw blade thereto, the other end of said frame being slotted to accommodate seating of the opposite end of the saw blade therethrough, the bifurcations of said other end of the frame having opposed essentially flat outer surfaces disposed generally parallel to the slotting thereof and having aligned circular shaped openings therethrough, a tension lever of a deformable rigid sheet material comprising an upstanding grip portion of generally U-shaped cross section having a pair of paralleled spaced forward ears and a pair of rearwardly disposed spaced ears, said forward ears overlying said opposed flat surfaces of said other end of the frame and having sliding contact therewith, said ears having portions of the material thereof pressed into integral trunnions journalled in said circular openings on which the tension lever is connected to said end of the frame for rotating about the axis of said aligned openings, said rearward disposed parallel ears of the tension member having portions adapted for pivotal attachment to the opposite end of the saw blade, the tension lever being pivotal on said integral trunnions to locate said rearward disposed ears below a center line including the axes of said openings into which the integral trunnions are pressed and of the pivotal connection of the first end of the saw blade for which the one end of the frame is adapted, said frame being slightly resilient, and said lever being rotatable on its trunnions to move said opposite end of the saw blade into and through the slotted other end of the frame so as to locate the portion of said rearward ears adapted for connection to the said opposite end of the saw blade behind said trunnion and above said center line to tension and lock the saw blade to the frame.

2. A saw as defined in claim 1 wherein the bifurcated portion is of essentially square-shaped cross section and the flat surfaces thereof with which forward ears of the tension lever have sliding engagement provide a large surface contact area between the said ears and the said other end of the frame to add stability to the handle as it rotates about the trunnions.

3. A saw as defined in claim 2 wherein the connection is a loose pin which is tightened into binding relation with the receiving openings when the saw blade is tensioned by rotating the tension lever to its closed position behind the said other end of the frame.

4. A saw as defined in claim 4 wherein the grip portion of the tension lever substantially conforms to the grasp of a user and cooperates with the other end of the frame against which it abuts in its closed position to form a comfortable grip, the surface of the handle blending with the thickness of said other end of the frame to present relatively smooth surfaces to the side of the grip, and a flare at the open top of the handle which provides means to initiate unlocking of the handle.

5. A saw comprising a saw blade, a frame having a pair of spaced ends, one end thereof being adapted for pivotal connection of the saw blade thereto, the other end of said frame being slotted to accommodate seating of the opposite end of the saw blade therethrough, the bifurcations of said other end of the frame having opposed essentially flat outer surfaces disposed generally parallel to the slotting thereof and having aligned circular shaped openings therethrough, a tension lever of deformable rigid sheet material comprising an upstanding grip portion of generally U-shaped cross section having a pair of parallel spaced forward ears and a pair of rearwardly disposed spaced ears, said forward ears overlying said opposed flat surfaces of said other end of the frame and having sliding contact therewith, said ears having integral portions thereof formed into integral trunnions journalled in said circular openings, the tension lever being connected on said trunnions to said end of the frame for rotating about the axis of said aligned openings, said rearward disposed parallel ears of the tension member having portions adapted for pivotal attachment to the opposite end of the saw blade, a loose pin connection which is tightened into binding relation with the pivotal attachment portion when the saw blade is tensioned by rotating the tension lever to its closed position behind the said other end of the frame, the tension lever being pivotal on said integral trunnions to locate said rearward disposed ears below, a center line including the axes of said openings into which the integral trunnions are mounted and of the pivotal connection of the first end of the saw blade for which the one end of the frame is adapted, said frame being slightly resilient, and said lever being rotatable on its trunnions to move said opposite end of the saw blade into and through the slotted other end of the frame so as to locate the portion of said rearward ears adapted for connection to the said opposite end of the saw blade behind said trunnion and above said center line to tension and lock the saw blade to the frame.

References Cited

UNITED STATES PATENTS

| 2,435,964 | 2/1948 | Graff | 145—38 |
| 2,467,914 | 4/1949 | Sare. | |
| 2,613,709 | 10/1952 | Terrill | 145—33 |
| 2,796,098 | 6/1957 | Drier | 145—33 |

FOREIGN PATENTS

| 31,832 | 2/1908 | Austria. |
| 885,679 | 6/1943 | France. |
| 30,185 | 8/1909 | Sweden. |

WILLIAM FELDMAN, *Primary Examiner.*

R. V. PARKER, *Assistant Examiner.*